United States Patent [19]

Milbourn

[11] Patent Number: 5,408,814
[45] Date of Patent: Apr. 25, 1995

[54] BRUSH CUTTER WORK HEAD WITH PIVOTABLE SHROUD

[76] Inventor: David E. Milbourn, 54 Milbourn La., Hoquiam, Wash. 98550

[21] Appl. No.: 191,795

[22] Filed: Feb. 3, 1994

[51] Int. Cl.6 .................... A01G 23/08; A01D 34/82
[52] U.S. Cl. ...................... 56/15.2; 56/17.4; 56/237; 144/3 D; 144/34 R
[58] Field of Search ............ 56/15.2, 17.4, 237, 56/320.1, 400.12, DIG. 24; 30/379, 379.5; 83/928; 144/3 D, 34 R, 335, 336

[56] References Cited

U.S. PATENT DOCUMENTS

| | | |
|---|---|---|
| 2,741,282 | 4/1956 | Wieting . |
| 3,818,957 | 6/1974 | Schoonover ................ 144/34 R |
| 3,969,856 | 7/1976 | Zerrer ........................ 51/268 |
| 4,446,897 | 5/1984 | Kurelek ...................... 144/34 R |
| 4,565,486 | 1/1986 | Crawford et al. .......... 144/3 D X |
| 4,769,977 | 9/1988 | Milbourn .................... 56/15.2 |
| 4,802,327 | 2/1989 | Roberts ...................... 56/15.2 |
| 4,901,508 | 2/1990 | Whatley ..................... 56/10.4 |
| 4,921,024 | 5/1990 | Wiemeri et al. ............ 144/336 |
| 5,042,727 | 8/1991 | Plante ........................ 144/3 D X |
| 5,103,882 | 4/1992 | Milbourn .................... 144/34 R |
| 5,113,919 | 5/1992 | MacLennan ................ 144/34 R |
| 5,201,350 | 4/1993 | Milbourn .................... 144/2 Z |
| 5,329,752 | 7/1994 | Milbourn .................... 144/34 R X |

*Primary Examiner*—George A. Suchfield
*Attorney, Agent, or Firm*—Joan H. Pauly

[57] ABSTRACT

A work head (20) has a main housing (28) pivotably mountable on a boom (14) of a brush cutting machine. A cutter wheel (64) is rotatably mounted on the housing (28) to rotate about a vertical axis (X). A shroud (38) is pivotably mounted on the housing (28) to pivot about the same axis (X). The shroud (38) substantially surrounds the cutter wheel (64). The inner race (76) of an annular bearing (74) is secured to a bottom wall (36) of the housing (28). The outer race (80) of the bearing (74) is secured to the top wall (40) of the shroud (38). A hydraulic motor (88) mounted on the housing (28) carries a pinion gear (92) that engages teeth (84) on the outer race (80) to pivot the shroud (38). A fixed gripper jaw (46) depends downwardly from the housing (28) adjacent to the shroud (38). An upper jaw (50) is pivotably mounted on the housing (28) to cooperate with the fixed jaw (46) to grip cut brush and other debris.

16 Claims, 4 Drawing Sheets

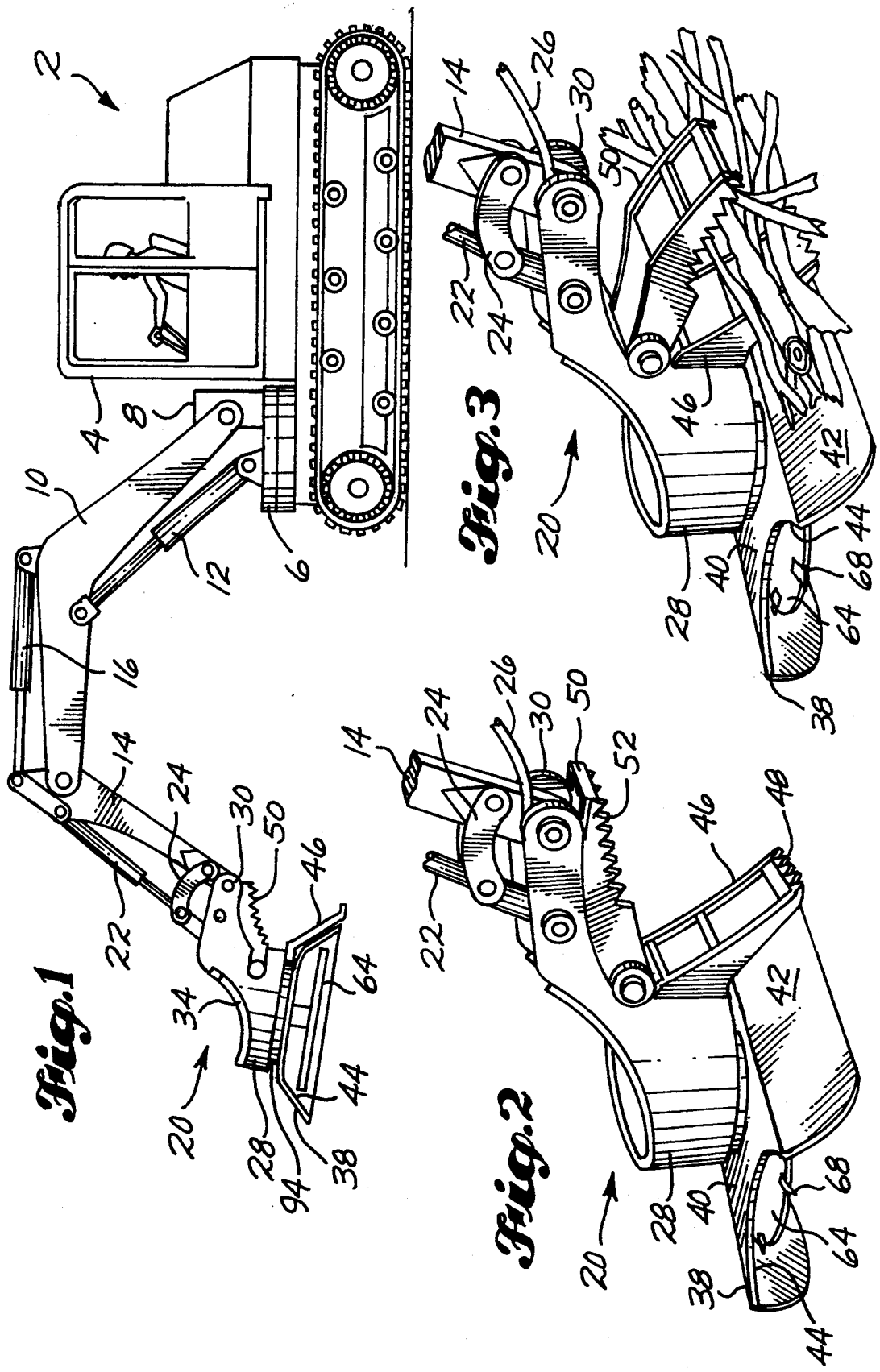

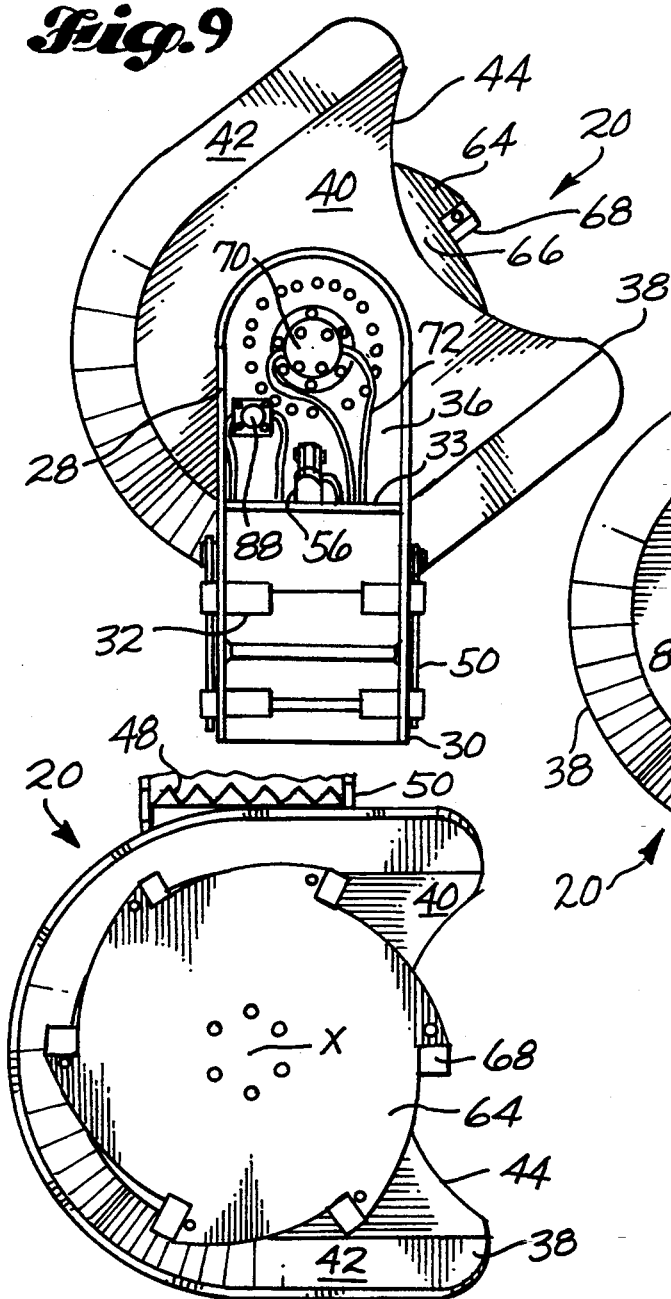
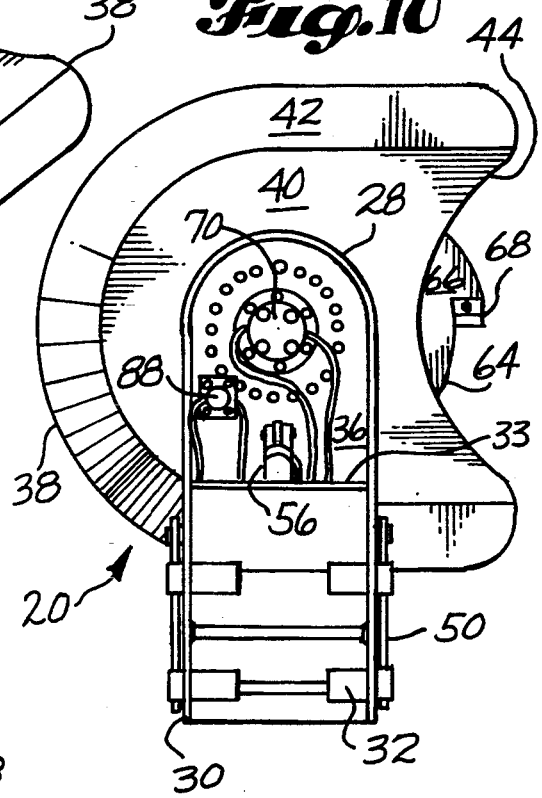
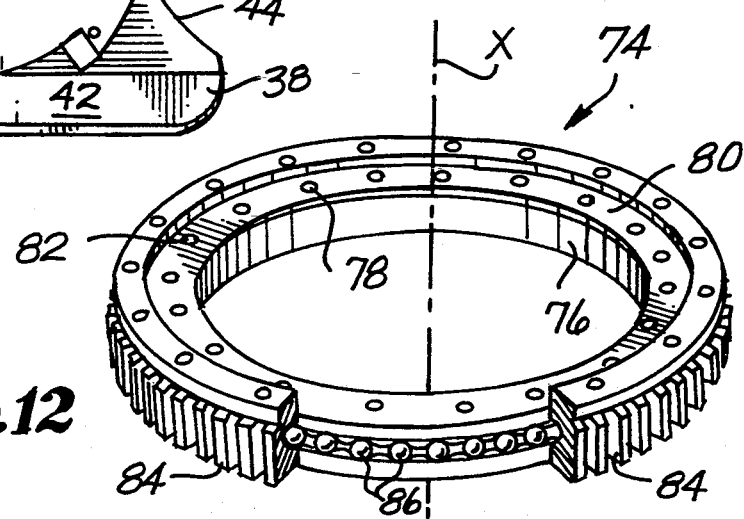

BRUSH CUTTER WORK HEAD WITH PIVOTABLE SHROUD

TECHNICAL FIELD

This invention relates to work heads for brush cutting machines and, more particularly, to such a work head that includes a cutter wheel and a protective shroud around the cutter wheel. The shroud has an opening to expose a peripheral portion of the cutter wheel to enable it to cut brush. The shroud is pivotably mounted on the work head housing to permit the shroud opening to be moved relative to the housing and thereby provide greater flexibility in cutting direction while maintaining the full protection of the shroud for maximized safety.

BACKGROUND INFORMATION

The patent literature includes various brush cutter attachments that are mountable on vehicles, such as tractors. A main purpose for mounting such an attachment on a vehicle is to enable the cutting of brush in relatively remote areas. Examples of situations requiring this ability include creating and maintaining rights-of-way for power lines, maintaining areas along roads, building roads, and keeping drainage ditches free of obstructions. The applicant's U.S. Pat. No. 4,769,977 discloses a brush cutter having an articulated three-boom structure mounted on a tractor type vehicle. A work head is mounted on the outer end of the outer boom. The arrangement disclosed in the patent is particularly well-suited to the efficient cutting of brush since it provides a high degree of maneuverability and, thus, greatly reduces the need to move the vehicle during a brush cutting operation.

SUMMARY OF THE INVENTION

The present invention is directed toward an improvement in brush cutter work heads. The invention was developed for use with the type of brush cutter disclosed in the above-cited patent but may also be incorporated into work heads for other types of brush cutting machines.

In general, the invention provides a work head for a brush cutting machine of a type having a boom structure including at least one boom. According to an aspect of the invention, the work head comprises a main housing mountable on an outer end of the boom. A cutter wheel is rotatably mounted on the housing to rotate about a vertical axis. The cutter wheel has a top surface bounded by an outer periphery. A shroud is pivotably mounted on the housing to pivot about the axis. The shroud substantially encloses the top surface and the periphery of the cutter wheel. A radial opening extends vertically through the shroud to expose a radially outer peripheral portion of the cutter wheel to enable the cutter wheel to cut brush. The housing and the shroud carry interengaging portions of a pivot device. The pivot device includes a pivot motor connectable to an activator remote from the housing. The motor is operable to pivot the shroud relative to the housing about the axis and thereby move the opening in the shroud relative to the housing.

The pivot device may take various forms. Preferably, the interengaging portions include first and second portions positioned between a downwardly facing bottom portion of the housing and an upwardly facing top portion of the shroud. The first and second portions are secured to the bottom portion and the top portion, respectively. In the preferred embodiment, the first and second portions comprise an inner race and an outer race of an annular bearing, respectively. The outer race has peripheral gear teeth. The pivot device includes a pinion gear operatively connected to the motor to be rotated by the motor. The pinion gear engages the gear teeth on the outer race to pivot the shroud. Preferably, a shield surrounding the outer race and the pinion gear is provided to protect the outer race and the pinion gear from dirt and debris.

A preferred feature of the invention is the inclusion in the work head of a pair of gripping jaws carried by the housing. The jaws include a lower fixed jaw and an upper pivotable jaw. The fixed jaw depends downwardly from the housing adjacent to the shroud. The upper jaw is pivotably mounted on the housing to pivot between an upper position spaced from the fixed jaw and a lower position adjacent to the fixed jaw for gripping debris between the jaws. When the work head is provided with the gripping jaws, the range of pivotal motion of the shroud relative to the housing is preferably such that the opening in the shroud remains circumferentially spaced from the lower fixed Jaw regardless of the pivotal position of the shroud. In the preferred embodiment, the shroud is pivotable relative to the housing through an arc of at least about 180° and the opening remains circumferentially spaced from the lower jaw.

According to another aspect of the invention, the work head comprises a main housing mountable on an outer end of the boom and having a downwardly facing bottom portion. A cutter wheel is rotatably mounted on the housing to rotate about a vertical axis. A shroud is pivotably mounted on the housing to pivot about the axis. The shroud surrounds peripheral portions of the cutter wheel and has an upwardly facing top portion adjacent to a top surface of the cutter wheel. The shroud also has a radial opening extending vertically therethrough to expose a peripheral portion of the cutter wheel to enable the cutter wheel to cut brush. The work head further comprises a pivot device that includes first and second portions positioned between the bottom portion of the housing and the top portion of the shroud. The first and second portions are secured to said bottom portion and said top portion, respectively. A pivot motor is carried by the housing and engages the second portion to pivot the shroud relative to the housing about the axis and thereby move the opening relative to the housing. The motor is connectable to an activator remote from the housing. The work head may also include one or more of the preferred features described above.

In the operation of work heads constructed according to the invention, the pivotability of the shroud relative to the main housing permits the cutting direction to be varied with little if any movement of the structure supporting the work head. When the work head is mounted on a vehicle with an articulated boom structure, the vehicle need not be moved when the brush is within the reach of the boom structure but the cutting direction requires adjustment. In such situations, only relatively little movement of the boom structure relative to the vehicle is required to, for example, change the cutting direction from a sideward motion to a direct forward motion. The ability to easily change the cutting direction provided by the invention greatly enhances the efficiency of a brush cutting operation without decreasing the level of safety. When the shroud is pivoted, the location, rather than the size, of the opening is changed. Thus, the full protection of the shroud is maintained regardless of the position of the shroud relative to the housing. The shroud remains fully functional to prevent unintended cutting of adjacent objects and to minimize flying debris.

BRIEF DESCRIPTION OF THE DRAWINGS

In the drawings, like element designations refer to like parts throughout, and:

FIG. 1 is an elevational view of the preferred embodiment of the work head mounted on a tractor by a two-boom structure.

FIG. 2 is a pictorial view of the work head and part of the boom structure shown in FIG. 1 looking toward the rear of the work head housing and showing the gripping jaws in an open position and the housing cover removed.

FIG. 3 is like FIG. 2 except that it shows the jaws moved toward each other to grip cut brush.

FIGS. 6-10 are top plan views of the work head shown in

FIGS. 2-5, illustrating different positions of the shroud relative to the housing. FIGS. 6-10 together illustrate the range of pivotal movement of the shroud relative to the housing.

FIG. 11 is a bottom plan view of the work head with the shroud in the position shown in FIG. 6.

FIG. 12 is a pictorial view of the preferred embodiment of the bearing/gear portion of the work head shown in FIGS. 1-11, with foreground portions cut away.

BEST MODE FOR CARRYING OUT THE INVENTION

Figure 4:
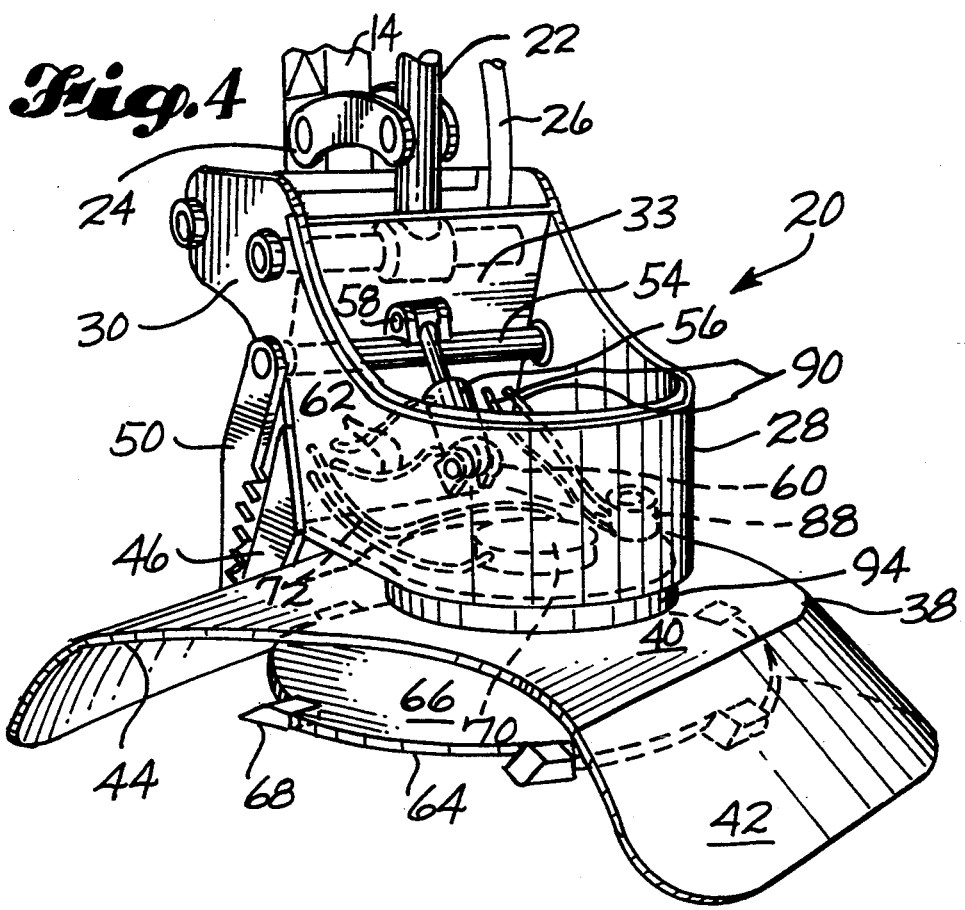
FIG. 4 is like FIG. 2 except that it shows the jaws closed and looks toward the front of the work head housing.

The drawings show a brush cutter work head 20 that is constructed according to the invention and that constitutes the best mode for carrying out the invention currently known to the applicant. As shown in FIG. 1, the work head 20 is attached to a tractor 2 of a common type in a two-boom arrangement. The tractor 2 and related structure are shown herein for the purpose of illustrating an installation of the work head of the invention. It is, of course, to be understood that the invention may also be used to advantage in connection with other types of tractors and similar machines and with other boom arrangements. For example, a three-boom structure mounted on a tractor is disclosed in the applicant's U.S. Pat. No. 4,769,977. This three-boom/tractor arrangement is a preferred mounting for the work head 20 since it helps to maximize the advantages of the invention.

Referring to FIG. 1, the tractor 2 has a cab 4 for the operator and a turntable 6 mounted to pivot about a vertical axis. A vertical post 8 is mounted on the turntable 6. A boom 10 of a known type is pivotally mounted on the post 8 to pivot about a horizontal axis. A hydraulic actuator 12 pivots the boom 10. An outer boom or stick 14 is pivotally mounted on the outer end of the inner boom 10. The stick 14 is pivoted relative to the boom 10 in a known manner by a hydraulic actuator 16. The actuator 16 is carried by the boom 10.

Referring to FIGS. 1-5, the illustrated preferred embodiment of the work head 20 is mounted on the outer end of the stick 14 to pivot about a horizontal axis. The pivoting of the work head 20 is accomplished by a hydraulic actuator 22 that is pivotally attached to the stick 14 and engages an upper rear yoke portion 30 of the work head 20. The stick 14 is pivotally attached to the yoke 30 and is connected to the piston portion of the actuator 22 by a pair of links 24. A wrapped bundle of cables 26 extends outwardly and rearwardly from the yoke 30 and along the boom structure in a known manner to the control system of the tractor 2. The bundle 26 includes hydraulic hoses and wiring for operating the cutter wheel 64 and the mechanisms for pivoting the shroud and the gripper jaw, described further below. FIGS. 6-11 show the work head 20 by itself with the mounting and actuating structure omitted. As can be seen in FIGS. 6-10, the work head 20 is preferably provided with two pairs of fittings 32 for receiving the pivot shafts for the stick 14 and the actuator 22 illustrated in FIGS. 1-5.

Still referring to FIGS. 1-5, the work head 20 of the invention includes a main housing 28. The upper rear portion of the housing 28 forms a rearwardly projecting yoke 30, mentioned above. Forward of the yoke 30, the top of the housing 28 has a removable cover 34 (FIG. 1). The cover 34 at least substantially seals the forward portion of the housing 28 to exclude mud and debris and thereby protect the components mounted therein. The bottom of the housing 28 is closed by a bottom wall 36 (FIGS. 6-10).

The work head 20 also includes a protective shroud 38 rotatably mounted on the housing 28 in accordance with the invention. The shroud 38 is mounted to pivot about a vertical axis X, shown in FIG. 5. The shroud 38 has a flat top wall 40 with a depending skirt 42. The skirt 42 extends downwardly and radially outwardly from the periphery of the top wall 40 and has a horseshoe-shaped plan configuration, as shown in FIGS. 6-11. A radial opening 44 extends vertically through one side of the skirt 42 and an adjacent portion of the top wall 40. The opening 44 exposes a radially outer peripheral portion of the cutter wheel 64 to enable the cutter wheel 64 to cut brush.

Figure 5:
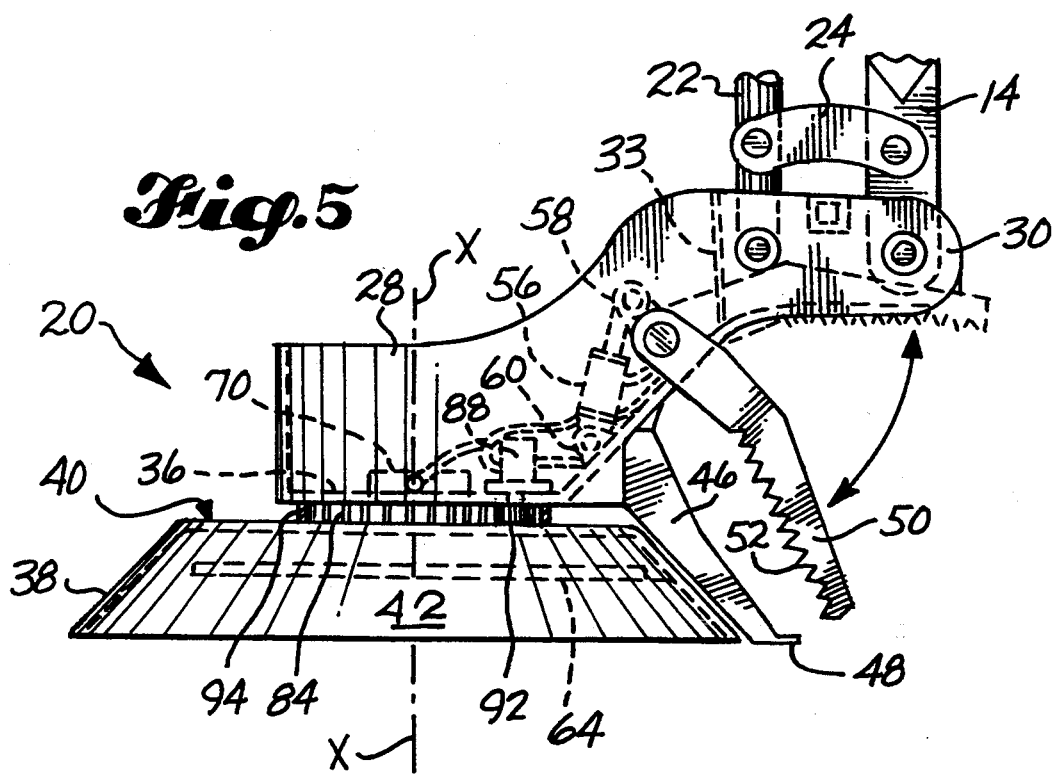
FIG. 5 is a side elevational view of the apparatus shown in FIGS. 2-4, illustrating the pivotal movement of the upper jaw, with the gear shield shown in section.
Figure 8:
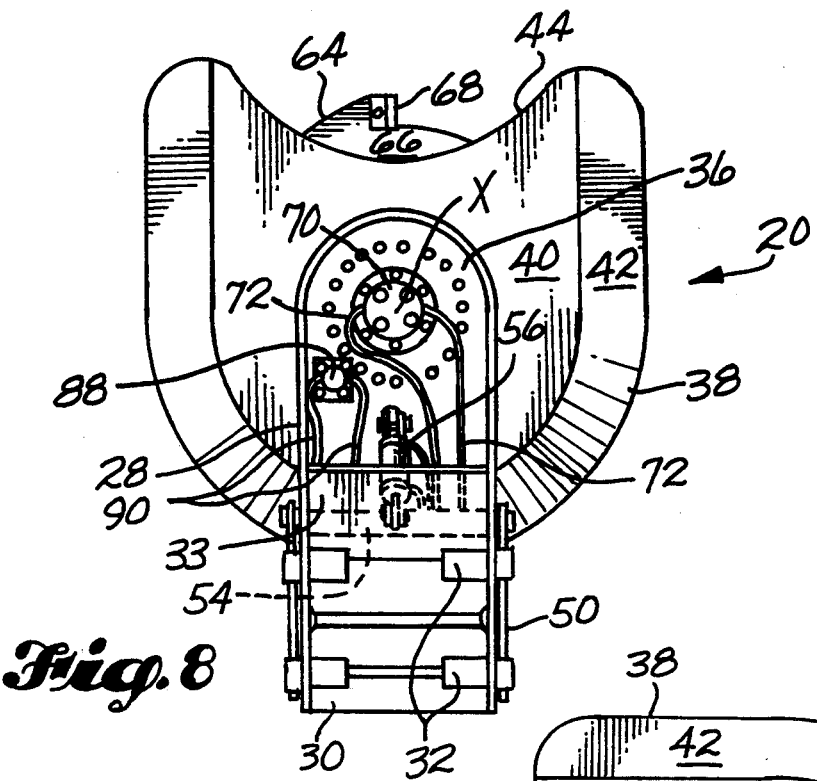

The work head 20 is preferably provided with a pair of gripping jaws 46, 50. Since the shroud 38 pivots relative to the housing 28, both of the jaws 46, 50 are mounted on the housing 28 so that they will always be in a position opposing each other regardless of the relative position of the shroud 38. Referring to FIGS. 1-5, the jaws include a lower fixed jaw 46 that depends downwardly and rearwardly from the rear of the housing 28 adjacent to the skirt portion 42 of the shroud 38. At its lower end, the jaw 46 terminates in rearwardly projecting teeth 48. As can be seen in FIGS. 1 and 5, the jaw 46 is spaced slightly from the skirt 42 to provide clearance for the relative pivotal motion of the skirt 42. The other jaw is an upper jaw 50 pivotally mounted on the housing at the forward end of the housing yoke 30. The upper jaw 50 has a plurality of teeth 52 formed along each of its opposite side edges.

The jaw 50 is mounted to pivot between an upper position spaced from the fixed jaw 46 and flush with the yoke 30, as shown in FIGS. 1 and 2, and a lower position adjacent to the fixed jaw 46 for gripping debris between the two jaws 46, 50, as illustrated in FIG. 3.

The arrow in FIG. 5 illustrates the pivotal motion of the upper jaw 50. FIG. 4 shows the upper jaw 50 in its lowermost position.

FIG. 4 also illustrates the mechanism for pivoting the jaw 50. The opposite side members of the jaw 50 are secured to a pivot shaft 54. The shaft 54 is pivoted by a hydraulic actuator 56 to pivot the jaw 50. The actuator 56 has opposite ends pivotally mounted on the housing 28 and the pivot shaft 54, respectively. The cylinder end of the actuator 56 is pivotally connected to a yoke 60 secured to a bulkhead 33 that is part of the work head housing 28. The piston rod of the actuator 56 is pivotally connected to a yoke 58 carried by the shaft 54. Hydraulic lines 62 extend from the opposite ends of the actuator cylinder to the bulkhead 33. On the opposite side of the bulkhead 33, there are fittings of a known type (not shown) for connecting the hydraulic lines 62 to cables in the cable bundle 26 of a tractor/boom structure on which the work head 20 is mounted.

A cutter wheel 64 is rotatably mounted on the housing 28 for cutting brush. The details of the wheel structure may be varied considerably without departing from the spirit and scope of the invention. For example, the cutting portions of the wheel may be provided in various forms, including separate teeth or a cutting chain. The preferred structure of the wheel 64 is shown in FIGS. 2-4 and 6-11. The wheel 64 has a top surface 66 that is adjacent to and at least substantially parallel to the top wall 40 of the shroud 38. A plurality of circumferentially spaced cutter teeth 68 are mounted on the outer periphery of the cutter wheel 64. Preferably, these teeth have the structure disclosed in the applicant's U.S. Pat. No. 5,103,882 and are removably mounted onto the wheel 64 in the manner disclosed in that patent. The wheel 64 is mounted to rotate about the same axis X about which the shroud 38 pivots. The axis X is defined by the axis of a hydraulic motor 70 which drives the cutter wheel 64. Hydraulic lines 72 extend from the motor 70 to the bulkhead 33, as shown in FIGS. 4-10. These lines 72 are provided with fittings at the bulkhead 33 to permit them to be connected to hydraulic cables, as described above in connection with the hydraulic lines 62 associated with the motor 56 for pivoting the jaws 50. This arrangement of the hydraulic lines 62, 72, 90 for each of the motors 56, 70, 88 makes it possible to quickly and easily connect the motors to the hydraulic system of a tractor 2 so that the motors 56, 70, 88 may be remotely controlled by an operator in the cab 4 of the tractor 2.

The pivotal mounting of the shroud 38 on the housing 28 is accomplished by means of an annular bearing/gear 74 positioned between the bottom wall 36 of the housing 28 and the top wall 40 of the shroud 38. The structure of the bearing/gear 74 is best seen in FIG. 12 and to a lesser extent FIG. 5. The bearing/gear 74 includes an inner race 76 and an outer race 80 with a plurality of hardened steel balls 86 positioned therebetween. The currently most preferred embodiment of the "RO-TEK" ™ Series 3000 bearing/gear 74 is a bearing Referring to FIG. 12, each of the bearing races 76, 80 has fastener openings 78, 82 for securing the race to a structure. The outer circumferential surface of the outer race 80 is provided with a plurality of gear teeth 84. The inner race 76 is secured to the downwardly facing outer surface of the bottom wall 36 of the housing 28 by means of suitable fasteners which engage the openings 78. The outer race 80 is secured to the upwardly facing outer surface of the top wall 40 of the shroud 38 by means of suitable fasteners that engage the openings 82.

The securing of the two bearing races 76, 80 to their respective structures 28, 38 pivotally mounts the shroud 38 onto the housing 28. Relative pivotal movement of the shroud 38 is provided by means of a hydraulic pivot motor 88, shown in FIGS. 4-10. The motor 88 is mounted on the housing 28. A drive shaft extends downwardly from the motor 88 through the housing bottom wall 36. The shaft carries a pinion gear 92 at its lower end. The pinion gear 92 engages the peripheral teeth 84 on the outer race 80 and is rotated by the motor 88 to thereby pivot the outer race 80 relative to the inner race 76 and the shroud 38 relative to the housing 28. Like the hydraulic actuators 56, 70, the pivot actuator 88 has a pair of hydraulic lines 90 extending therefrom to the bulkhead 33 for connecting the motor 88 to hydraulic cables carried by a structure on which the work head 20 is mounted. Preferably, a shield 94 surrounds the outer race 80 and the pinion gear 92 to protect them from dirt and debris. The shield 94 is shown in section in FIG. 5 so that the gear teeth 84 and the pinion gear 92 can be seen.

Figure 6:
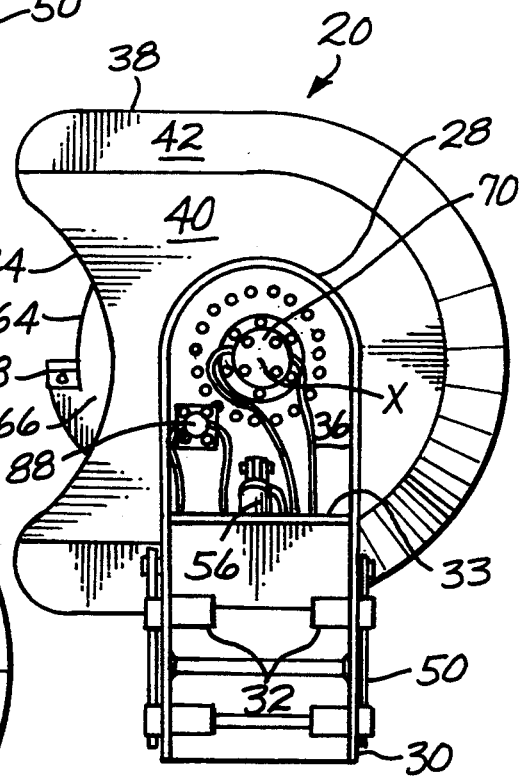
Figure 7:
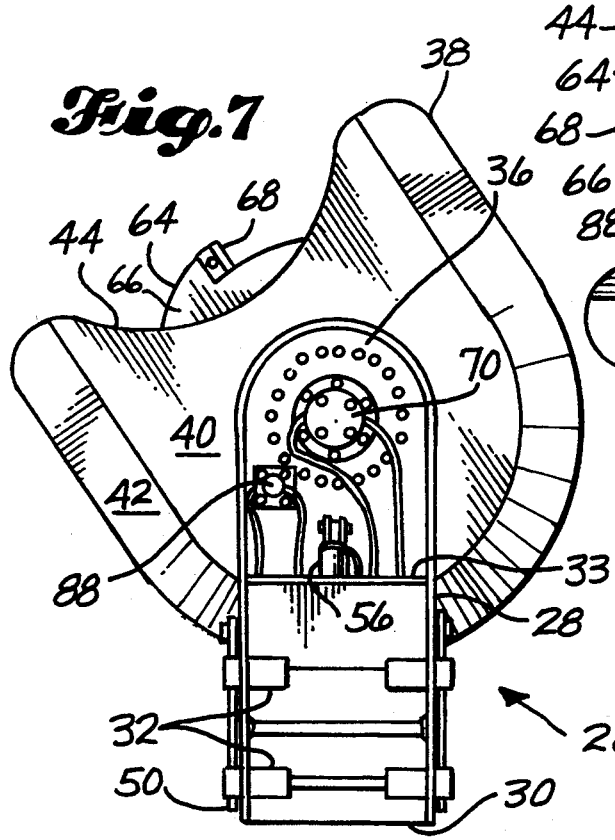

The cutter wheel motor 70 and its drive shaft extend downwardly through the bottom wall 36 of the housing 28 and the top wall 40 of the shroud 38 and through the center of the bearing/gear 74. Preferably, the connection between the motor shaft and the cutter wheel 64 is provided with the type of sealing arrangement disclosed in the applicant's U.S. Pat. No. 4,769,977. It is also preferable that a wire shear be provided at the connection to prevent wire from becoming entangled around the cutter wheel 64 and/or its drive shaft. FIGS. 6-11 collectively illustrate the pivoting of the shroud 38 relative to the work head housing 28. Each of FIGS. 6-10 is a top plan view illustrating a position of the shroud 38 relative to the housing 28. In the preferred embodiment, the shroud 38 pivots in either direction relative to the housing 28 through an arc of 180°. The two extreme positions of the shroud 38 at the ends of this arc are shown in FIGS. 6 and 10. FIG. 11 is a bottom plan view of the shroud 28 in the position shown in FIG. 6. As shown in FIGS. 6-10, the shroud positions begin with the shroud opening 44 facing in a leftward (as shown) direction and progress in increments of 45° in a clockwise direction to the position in FIG. 10 in which the opening 44 faces in a rightward (as shown) direction. The relative pivotal movement of the shroud 38 provided by the motor 88 and the engagement of the pinion gear 92 with the outer race 80 is a continuous motion. Therefore, the shroud 38 may also assume virtually any relative position between the particular positions shown in FIGS. 6-10. In addition, the shroud 38 may be pivoted while the cutter wheel 64 is rotating to cut brush as well as when the wheel 64 is not in use.

The pivoting of the shroud 38 relative to the housing 28 and the accompanying pivoting of the position of the opening 44 relative to the housing 28 facilitates the brush cutting procedure, as described above. While brush is being cut, the full protection of the shroud 38 is maintained since only a relatively small portion of the periphery of the cutter wheel 64 is exposed at any one time. The size of this exposed portion is determined by the size of the opening 44 and remains constant regardless of the relative position of the shroud 38. In short, the pivoting of the entire shroud 38 as a unit to adjust the position of the opening 44 provides the desired flexibility in cutting direction while ensuring that the cutter wheel 64 is always substantially enclosed across its top and around its periphery.

The horseshoe-shaped plan configuration of the shroud 38 shown in FIGS. 6–11 is currently the preferred configuration. It provides both adequate exposure of the cutter wheel 64 for cutting brush and maximum protection against flying debris. It also aids in the integration of the gripper jaws 46, 50 into the work head 20. For any of the positions of the shroud 38 along its pivotal arc, the jaws 46, 50 remain circumferentially spaced from the shroud opening 44 so that the lower jaw 46 does not interfere with the opening 44 and the jaws 46, 50 may be operated without changing the position of the shroud 38.

As used herein, the terms "top", "bottom", "upwardly", "downwardly", and the like are used in reference to the use orientation of the work head of the invention shown in FIGS. 1–5. These terms are used herein in order to facilitate the description of the invention. It is intended to be understood that the work head of the invention is not limited to the use orientation shown in FIGS. 1–5 and that the work head may also be used in other orientations, such as a vertical or angled orientation relative to the ground or an orientation in which the "upward" and "downward" directions are reversed.

Although the preferred embodiment of the invention has been illustrated and described herein, it is intended to be understood by those skilled in the art that various modifications and omissions in form and detail may be made without departing from the spirit and scope of the invention as defined by the following claims.

What is claimed is:

1. A work head for a brush cutting machine of a type having a boom structure including at least one boom, comprising:
   a main housing mountable on an outer end of said boom;
   a cutter wheel rotatably mounted on said housing to rotate about a vertical axis, said cutter wheel having a top surface bounded by an outer periphery;
   a shroud pivotably mounted on said housing to pivot about said axis, said shroud substantially enclosing said top surface and said periphery of said cutter wheel, and said shroud having a radial opening extending vertically therethrough to expose a radially outer peripheral portion of said cutter wheel to enable said cutter wheel to cut brush; and
   a pivot device having interengaging portions carried by said housing and said shroud, said pivot device including a pivot motor connectable to an activator remote from said housing and operable to pivot said shroud relative to said housing about said axis and thereby move said opening relative to said housing.

2. The work head of claim 1, in which said interengaging portions include first and second portions positioned between a downwardly facing bottom portion of said housing and an upwardly facing top portion of said shroud and secured to said bottom portion and said top portion, respectively.

3. The work head of claim 2, in which said first and second portions comprise an inner race and an outer race of an annular bearing, respectively, said outer race having peripheral gear teeth, said pivot device including a pinion gear operatively connected to said motor to be rotated by said motor, and said pinion gear engaging said gear teeth to pivot said shroud.

4. The work head of claim 3, comprising a shield surrounding said outer race and said pinion gear to protect said outer race and said pinion gear from dirt and debris.

5. The work head of claim 1, in which said shroud is pivotable relative to said housing through an arc of at least about 180°.

6. The work head of claim 1, comprising a pair of gripping jaws carried by said housing; said jaws including a lower fixed jaw depending downwardly from said housing adjacent to said shroud, and an upper jaw pivotably mounted on said housing to pivot between an upper position spaced from said fixed jaw and a lower position adjacent to said fixed jaw for gripping debris between said jaws.

7. The work head of claim 6, in which said shroud is pivotable relative to said housing through an arc of at least about 180°, and said opening remains circumferentially spaced from said lower fixed jaw regardless of the pivotal position of said shroud along said arc.

8. The work head of claim 7, in which said interengaging portions include first and second portions positioned between a downwardly facing bottom portion of said housing and an upwardly facing top portion of said shroud and secured to said bottom portion and said top portion, respectively.

9. The work head of claim 6, in which said interengaging portions include first and second portions positioned between a downwardly facing bottom portion of said housing and an upwardly facing top portion of said shroud and secured to said bottom portion and said top portion, respectively.

10. A work head for a brush cutting machine of a type having a boom structure including at least one boom, comprising:
    a main housing mountable on an outer end of said boom and having a downwardly facing bottom portion;
    a cutter wheel rotatably mounted on said housing to rotate about a vertical axis;
    a shroud pivotably mounted on said housing to pivot about said axis, said shroud surrounding peripheral portions of said cutter wheel and having an upwardly facing top portion adjacent to a top surface of said cutter wheel, and said shroud having a radial opening extending vertically therethrough to expose a peripheral portion of said cutter wheel to enable said cutter wheel to cut brush; and
    a pivot device including first and second portions positioned between said bottom portion of said housing and said top portion of said shroud and secured to said bottom portion and said top portion, respectively, and a pivot motor carried by said housing and engaging said second portion to pivot said shroud relative to said housing about said axis and thereby move said opening relative to said housing; said motor being connectable to an activator remote from said housing.

11. The work head of claim 10, in which said first and second portions comprise an inner race and an outer race of an annular bearing, respectively, said outer race having peripheral gear teeth, said pivot device including a pinion gear operatively connected to said motor to be rotated by said motor, and said pinion gear engaging said gear teeth to pivot said shroud.

12. The work head of claim 11, comprising a shield surrounding said outer race and said pinion gear to protect said outer race and said pinion gear from dirt and debris.

13. The work head of claim 10, in which said shroud is pivotable relative to said housing through an arc of at least about 180°.

14. The work head of claim 10, comprising a pair of gripping jaws carried by said housing; said jaws including a lower fixed jaw depending downwardly from said housing adjacent to said shroud, and an upper jaw pivotably mounted on said housing to pivot between an upper position spaced from said fixed jaw and a lower position adjacent to said fixed jaw for gripping debris between said jaws.

15. The work head of claim 14, in which said shroud is pivotable relative to said housing through an arc of at least about 180°, and said opening remains circumferentially spaced from said lower fixed jaw regardless of the pivotal position of said shroud along said arc.

16. The work head of claim 15, in which said first and second portions comprise an inner race and an outer race of an annular bearing, respectively, said outer race having peripheral gear teeth, said pivot device including a pinion gear operatively connected to said motor to be rotated by said motor, and said pinion gear engaging said gear teeth to pivot said shroud.

* * * * *

UNITED STATES PATENT AND TRADEMARK OFFICE
CERTIFICATE OF CORRECTION

PATENT NO. : 5,408,814
DATED : April 25, 1995
INVENTOR(S) : David E. Milbourn It is certified that error appears in the above-identified patent and that said Letters Patent is hereby corrected as shown below:

Column 2, line 23, "Jaw" should be -- jaw --.

Column 3, line 30, there should be no new paragraph after "shown in".

Column 4, line 28, "28has" should be -- 28 has --.

Column 5, line 45, "jaws 50" should be -- jaw 50 --.

Column 5, lines 59-60, "most preferred embodiment of the "ROTEK"™ Series 3000 bearing/gear 74 is a bearing" should read
-- most preferred embodiment of the bearing/gear 74 is a "ROTEK" (trademark) Series 3000 bearing. --.

Column 6, line 33, "Figs. 6-11" should begin a new paragraph.

Signed and Sealed this

Tenth Day of October, 1995

Attest:

BRUCE LEHMAN

*Attesting Officer*   *Commissioner of Patents and Trademarks*